United States Patent
Miller

(10) Patent No.: US 9,943,944 B1
(45) Date of Patent: Apr. 17, 2018

(54) PHASE ALIGNMENT DEVICE

(71) Applicant: Roger Miller, Richardson, TX (US)

(72) Inventor: Roger Miller, Richardson, TX (US)

( * ) Notice: Subject to any disclaimer, the term of this patent is extended or adjusted under 35 U.S.C. 154(b) by 0 days.

(21) Appl. No.: 15/017,643

(22) Filed: Feb. 7, 2016

(51) Int. Cl.
| | |
|---|---|
| B24B 47/04 | (2006.01) |
| G01B 11/26 | (2006.01) |
| F16D 1/033 | (2006.01) |
| G01B 5/25 | (2006.01) |
| F01D 5/02 | (2006.01) |
| F16D 1/12 | (2006.01) |
| B25B 27/16 | (2006.01) |

(52) U.S. Cl.
CPC ............. *B24B 47/04* (2013.01); *B25B 27/16* (2013.01); *F01D 5/026* (2013.01); *F16D 1/033* (2013.01); *F16D 1/12* (2013.01); *G01B 5/25* (2013.01); *G01B 11/26* (2013.01)

(58) Field of Classification Search
CPC .......... G01B 5/25; G01B 11/26; G01B 11/27; G01B 11/272; F16D 1/033; F16D 1/12; F16D 5/02; F16D 5/026; B24B 47/04; B24B 47/26
USPC ............................................. 33/645, DIG. 21
See application file for complete search history.

(56) References Cited

U.S. PATENT DOCUMENTS

| | | | | |
|---|---|---|---|---|
| 4,422,757 | A * | 12/1983 | Munski .................. | G01B 11/26 33/286 |
| 6,371,626 | B1 * | 4/2002 | Addona ............... | G01C 15/002 33/520 |
| 6,393,708 | B1 * | 5/2002 | Culver et al. .......... | G01B 11/27 33/227 |
| 6,718,644 | B1 * | 4/2004 | Perkins et al. ....... | G01B 11/272 33/227 |
| 7,114,924 | B2 * | 10/2006 | Munsch .................. | B25B 27/16 416/143 |
| 7,748,127 | B1 * | 7/2010 | Cosimano ............ | G01C 15/002 33/286 |
| 7,861,425 | B2 * | 1/2011 | Buckus ..................... | B64F 5/10 29/407.09 |
| RE45,010 | E * | 7/2014 | Loftis ....................... | F16L 1/10 33/286 |
| 9,346,561 | B2 * | 5/2016 | VanBuskirk et al. . | B64F 5/0045 |

OTHER PUBLICATIONS

Google search for "chinook helicopter shaft hole 8" conducted Feb. 14, 2015 providing TM 55-1520-240-23-5, p. 6-342.*
TM 55-1520-240-23-5, Technical Manual, Aviation Unit and Aviation Intermediate Maintenance Manual, CH-47D Helicopter, dated Sep. 19, 2002, included herein 3 pages only, the title page and technical pp. 6-342 & 6-343, for the procedure titled Install AFT Rotor Shaft Securing Device (T50).*

* cited by examiner

*Primary Examiner* — R. A. Smith

(57) ABSTRACT

The phase alignment device to be used with a phase alignment tool may include a body section; and a driving head section connected to the body section. The body section and the driving head section may include an aperture which extends through the body section and the driving head section.

2 Claims, 2 Drawing Sheets

PHASE ALIGNMENT DEVICE

FIELD OF THE INVENTION

The present invention relates to a phase alignment device which may be used with a phase alignment tool.

BACKGROUND

Summary

The phase alignment device to be used with a phase alignment tool may include a body section; and a driving head section connected to the body section. The body section and the driving head section may include an aperture which extends through the body section and the driving head section.

The phase alignment device to be used with a phase alignment may include the body section being cylinder shaped.

The phase alignment device to be used with a phase alignment may include the driving head section being hexagon shaped.

The phase alignment device to be used with a phase alignment may include the body section being thread free.

BRIEF DESCRIPTION OF THE DRAWINGS

The invention may be understood by reference to the following description taken in conjunction with the accompanying drawings, in which, like reference numerals identify like elements, and in which.

DETAILED DESCRIPTION

Figure 1:
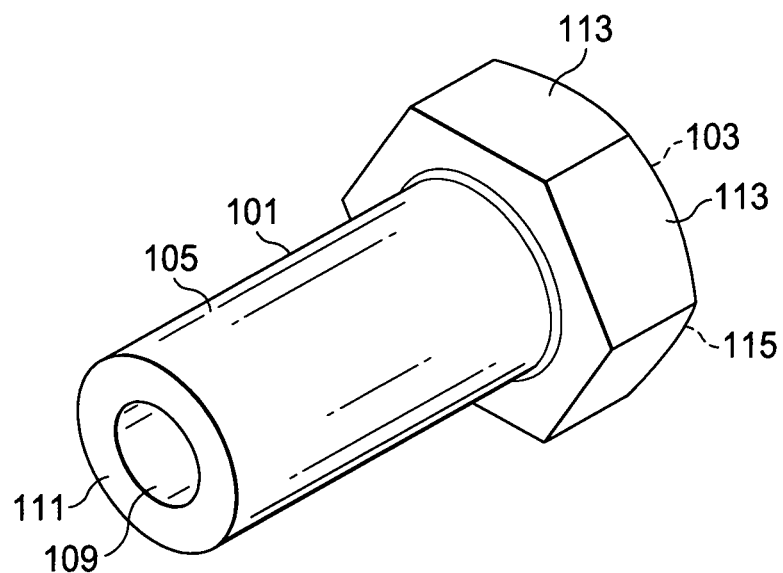
FIG. 1 illustrates a back perspective view of the phase alignment device of the present invention.

FIG. 1 illustrates a back perspective view of the phase alignment device 100 of the present invention and illustrates a body section 101 and a driving head section 103 which may be integrally connected to the body section 101. The body section 101 and the driving head section 103 may be formed from the same material which may be metal including steel, wood, plastic or other appropriate material. The body section 101 may include an outer peripheral surface 105 and an opposing inner peripheral surface 107 which may define a central aperture 109 which may extend through the phase alignment device 100 to cooperate with a shaft (not shown).

The body section 101 may include a bottom surface 111 which may connect the outer peripheral surface 105 with the inner peripheral surface 107.

The driving head section 103 may be a hexagon shaped and may include a plurality of driving surfaces 113 which may extend around the periphery of the driving head section 103 and may include a top surface 115 which may connect the driving surfaces 113 and the central aperture 109 may extend through the top surface 115.

Figure 2:
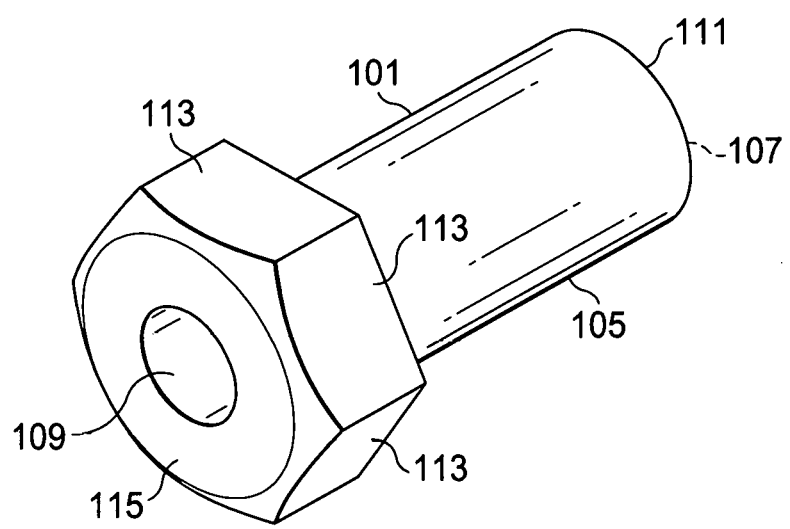
FIG. 2 illustrates a front perspective view of the phase alignment device of the present invention.

FIG. 2 illustrates a front perspective view of the phase alignment device 100 of the present invention and illustrates a body section 101 and a driving head section 103 which may be integrally connected to the body section 101. The body section 101 and the driving head section 103 may be formed from the same material which may be metal including steel, wood, plastic or other appropriate material. The body section 101 may include an outer peripheral surface 105 and an opposing inner peripheral surface 107 which may define a central aperture 109 which may extend through the phase alignment device 100 to cooperate with a shaft (not shown).

The body section 101 may include a bottom surface 111 which may connect the outer peripheral surface 105 with the inner peripheral surface 107.

The driving head section 103 may be a hexagon shaped and may include a plurality of driving surfaces 113 which may extend around the periphery of the driving head section 103 and may include a top surface 115 which may connect the driving surfaces 113 and the central aperture 109 may extend through the top surface 115.

Figure 5:
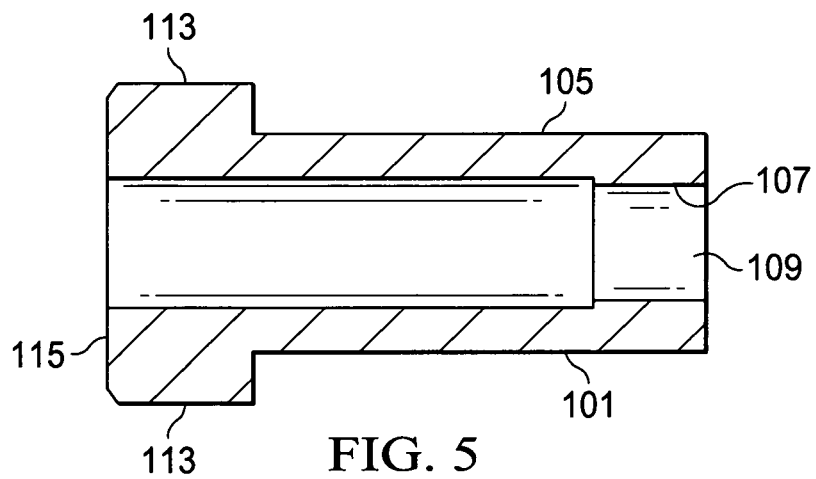
FIG. 5 illustrates a cross-sectional side view of the phase alignment device of the present invention.

FIG. 5 illustrates a cross-sectional the view of the phase alignment device 100 of the present invention and illustrates a body section 101 and a driving head section 103 which may be integrally connected to the body section 101. The body section 101 and the driving head section 103 may be formed from the same material which may be metal including steel, wood, plastic or other appropriate material. The body section 101 may include an outer peripheral surface 105 and an opposing inner peripheral surface 107 which may define a central aperture 109 which may extend through the phase alignment device 100 to cooperate with a shaft (not shown).

The body section 101 may include a bottom surface 111 which may connect the outer peripheral surface 105 with the inner peripheral surface 107.

The driving head section 103 may be a hexagon shaped and may include a plurality of driving surfaces 113 which may extend around the periphery of the driving head section 103 and may include a top surface 115 which may connect the driving surfaces 113 and the central aperture 109 may extend through the top surface 115.

Figure 4:
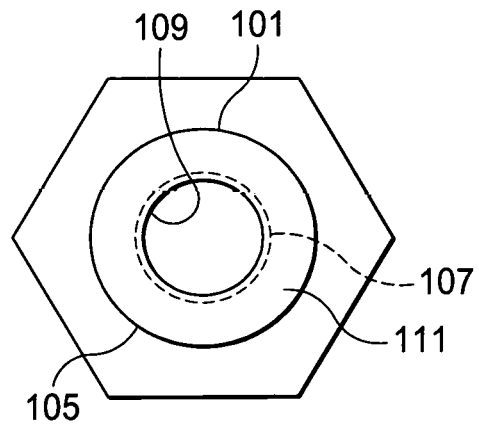
FIG. 4 illustrates a back view of the phase alignment device of the present invention.

FIG. 4 illustrates a bottom view of the body section 101 and illustrates the bottom surface 111, the central aperture 109, the outer peripheral surface 105 and the inner peripheral surface 107.

Figure 3:
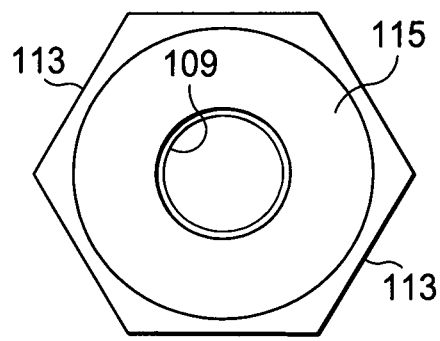
FIG. 3 illustrates a front view of the phase alignment device of the present invention.

FIG. 3 illustrates a top view of the driving head section 103 and illustrates the top surface 115, the driving surface 113 and the central aperture 109.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed.

The invention claimed is:

1. A phase alignment device to be used with a phase alignment tool, comprising:
   a body section wherein the body section is cylinder shaped, and
   a driving head section connected to the body section wherein the driving head section is hexagon shaped;
   wherein the driving head section includes an aperture which extend through the body section and the drive head section.

2. The phase alignment device to be used with a phase alignment tool as in claim 1, wherein the body section is thread free.

* * * * *